Figure 1:
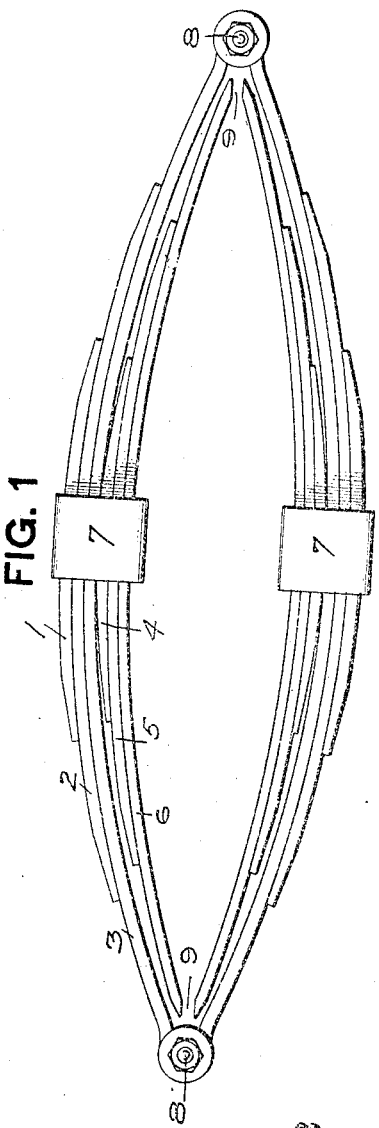

No. 881,948. PATENTED MAR. 17, 1908.
W. G. PRICE.
ELLIPTIC SPRING.
APPLICATION FILED AUG. 18, 1906.

WITNESSES.
J. R. Keller
Robert C. Totten

INVENTOR.
William G. Price
By Kay Totten & Winter
attorneys

UNITED STATES PATENT OFFICE.

WILLIAM G. PRICE, OF NEW CASTLE, PENNSYLVANIA.

ELLIPTIC SPRING.

No. 881,948.   Specification of Letters Patent.   Patented March 17, 1908.

Application filed August 18, 1906. Serial No. 331,141.

*To all whom it may concern:*

Be it known that I, WILLIAM G. PRICE, a resident of New Castle, in the county of Lawrence and State of Pennsylvania, have invented a new and useful Improvement in Elliptic Springs; and I do hereby declare the following to be a full, clear, and exact description thereof.

This invention relates to elliptic springs, and especially to such springs for use supporting the bolsters of motor car trucks and the like.

The object of the invention is to provide an elliptic spring sufficiently strong to carry the heavy weight of modern motor cars, and one which at the same time is easy riding.

In electric motor trucks as at present designed it is desirable to use a narrow bolster. This necessitates the use of narrow elliptic bolster springs and in order to carry the heavy cars these springs must have a comparatively large number of leaves, at least six or eight being required.

It is well known that when an elliptic spring oscillates the leaves which rest upon each other slide one upon the other to a slight extent, thus producing friction which retards movement of the spring and brings the oscillations to rest. In other words the friction absorbs the energy of motion so as to slow down and stop the oscillations. This is called the "damping" effect of elliptic springs. When more than four leaves are in contact the damping effect becomes so great that the oscillation of the spring is checked very quickly and consequently the spring becomes hard riding. This can be explained as follows: In a properly designed elliptic spring, each leaf carries an equal proportion of the load. Suppose that we represent the load carried by each leaf to be 100 pounds. Consequently the outer leaf presses upon the second leaf with a pressure of 100 pounds, the second leaf presses upon the third with a pressure of 100 pounds plus 100 pounds, or 200 pounds, while the third presses upon the fourth with a pressure of 300 pounds, and so on continuously through the number of leaves in the spring. It is well known that the friction of two smooth surfaces in sliding contact varies in direct proportion to the weight which presses or holds those surfaces in contact, and does not depend upon the extent of surface in contact. The co-efficient of friction between steel plates such as elliptic springs are ordinarily made of is approximately 20 per cent. of the pressure.

It will be readily understood from the foregoing that the frictional resistance against the oscillation of the spring, in other words, the damping effect of the spring, increases arithmetically according to the number of leaves composing the spring and in contact with each other. Consequently a spring having the required number of leaves to carry modern heavy cars has a very high damping co-efficient and becomes a hard riding spring.

The object of this invention is to provide a spring having a sufficient number of leaves of the narrow width required for electric motor trucks to carry modern heavy cars, but which nevertheless is an easy riding spring, or in other words, is a spring having a low damping co-efficient. This object is secured by dividing the spring, or the leaves of the spring, into groups so that not more than three of the leaves consecutively are in contact, thus in effect providing a plurality of independent springs each having a low damping co-efficient.

The invention also consists in making the inner spring of lighter metal than the outer spring, in order to provide equal fiber strains throughout.

Figure 2:
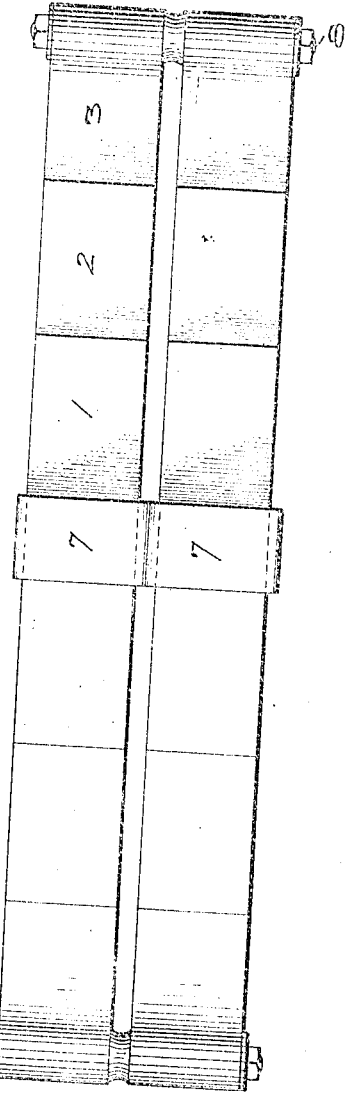
Figure 3:
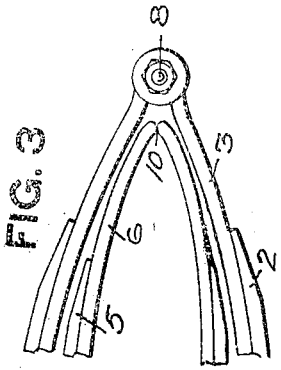

In the accompanying drawings Figure 1 is a side view of a spring constructed according to my invention; Fig. 2 is a plan view thereof; and Fig. 3 is a view of one end of a spring showing a modification.

The spring shown in the drawing is a double spring as seen in Fig. 2, each spring being composed of six leaves divided into an outer group, and composed of three leaves numbered 1, 2 and 3, respectively; and an inner group of a similar number of leaves numbered 4, 5 and 6, respectively. Each of these groups has leaves of varying lengths as shown, and said leaves are connected at their middle portions by the usual bands 7. These groups constitute in effect two separate elliptic springs, the outer one being longer than the inner one. The ends of the longest leaves 3 of the outer spring are in contact and united to each other by means of the bolts 8, while the ends of the longest leaves 6 of the inner spring are preferably out of contact with each other when the spring is not under load, as shown at 9, Fig. 1, although they may be in contact with each other as shown at 10, Fig. 3. To permit the ready assembling of the springs, however, the construction shown in Fig. 1 is preferred. Fig. 2 shows a double spring having two sets of springs side by side and united by the end connecting bolts 8.

It will be observed that only three of the six leaves composing the spring are in contact consecutively. The leaf 4 of the inner group is of couple in contact with the leaf 3 of the outer group, but this is only at the middle portion and the taper of the short leaf 4 is such that these groups contact practically only at the spring band, at which point there is practically no sliding movement one on the other. The result is that the damping effect of each group of springs is limited to two consecutive contacts. For instance, the leaf 1 presses on the leaf 2 with 100 pounds pressure, and the leaf 2 presses on the leaf 3 with 200 pounds pressure, making a total for the group of 300 pounds. As the friction is approximately 20 per cent. of this, it amounts to 60 pounds. The same holds true with reference to the inner group, so that the total friction or damping effect for the spring is 120 pounds. If, now, the spring were made up of six leaves all in contact with each other, the pressure of the first on the second would be 100 pounds, of the second on the third, 200 pounds, of the third on the fourth, 300 pounds, of the fourth on the fifth, 400 pounds, and of the fifth on the sixth, 500 pounds, or a total of 1500 pounds. Twenty per cent. of this is 300 pounds, so that the damping effect would be two and one-half times the damping effect of a spring having the same carrying capacity when constructed as shown in the drawings. The result is that my spring is an easy riding spring, while the other spring is a very hard riding spring.

Inasmuch as the inner spring is shorter than the outer spring, it works on a shorter leverage and consequently if the leaves were of the same thickness as those of the outer spring, the fiber strains on the inner spring would be the greater. To avoid this it is necessary to make the inner spring either of a weaker metal or, what is more practical, make it of thinner plates than the outer spring, so that when compressed the fiber strain will be uniform throughout. The drawing shows the leaves of the inner spring thinner than those of the outer spring.

While I have shown the invention applied to a spring having two groups of three leaves each, it will be apparent that it can be applied to a spring having any reasonable number of groups, each group composed of any reasonable number of leaves.

What I claim is:

An elliptic spring comprising a plurality of complete springs each composed of a plurality of leaves, said springs being placed one within the other and being in contact only at their middles, the leaves of the inner spring or springs being thinner than those of the outer spring.

In testimony whereof, I, the said WILLIAM G. PRICE have hereunto set my hand.

WILLIAM G. PRICE.

Witnesses:
M. D. VOGEL,
F. W. WINTER.